United States Patent
Keegan

(10) Patent No.: US 6,613,469 B2
(45) Date of Patent: Sep. 2, 2003

(54) FLUID DISTRIBUTION SURFACE FOR SOLID OXIDE FUEL CELLS

(75) Inventor: Kevin Richard Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 198 days.

(21) Appl. No.: 09/747,752

(22) Filed: Dec. 22, 2000

(65) Prior Publication Data

US 2002/0081481 A1 Jun. 27, 2002

(51) Int. Cl.[7] ................................. H01M 8/04
(52) U.S. Cl. .............................. 429/34; 429/39; 429/30
(58) Field of Search ............................. 429/34, 39, 30

(56) References Cited

U.S. PATENT DOCUMENTS

| | | | |
|---|---|---|---|
| 6,214,486 B1 * | 4/2001 | Okamoto | 429/39 X |
| 6,251,308 B1 * | 6/2001 | Butler | 429/30 X |
| 6,387,558 B1 * | 5/2002 | Mizuno et al. | 429/34 |
| 6,432,567 B1 * | 8/2002 | Doggwiler et al. | 429/34 X |
| 6,461,754 B1 * | 10/2002 | Zeng | 429/34 X |

* cited by examiner

Primary Examiner—John S. Maples
(74) Attorney, Agent, or Firm—Vincent A. Cichosz

(57) ABSTRACT

An electrode fluid distributor includes a fluid passageway having a plurality of segment pairs each including an inlet segment in fluid communication with an inlet and an outlet segment in fluid communication with an outlet. A baffle is disposed between adjacent inlet and outlet segments. Each inlet segment is in fluid communication with adjacent inlet segments and adjacent outlet segments, and each outlet segment is in fluid communication with adjacent outlet segments.

21 Claims, 5 Drawing Sheets

FLUID DISTRIBUTION SURFACE FOR SOLID OXIDE FUEL CELLS

TECHNICAL FIELD

The present disclosure relates to solid oxide fuel cells, and more particularly relates to a solid oxide fuel cell structure including a fluid distribution system.

BACKGROUND

Alternative transportation fuels have been represented as enablers to reduce toxic emissions in comparison to those generated by conventional fuels. At the same time, tighter emission standards and significant innovation in catalyst formulations and engine controls have led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, liquid petroleum gas, etc.) to significant toxic and $CO_2$ emission improvements (natural gas, dimethylether, etc.). Hydrogen is clearly the ultimate environmental fuel, with potential as a nearly emission free internal combustion engine fuel (including $CO_2$ if it comes from a non-fossil source). Unfortunately, the market-based economics of alternative fuels, or new power train systems, are uncertain in the short to mid-term.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells ("SOFC"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat.

SOFC's are constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC cell stack also includes conduits or manifolds to allow passage of the fuel and oxidant into and byproducts, as well as excess fuel and oxidant, out of the stack. Generally, in certain cell configurations, oxidant is fed to the structure from a manifold located on one side of the stack, while fuel is provided from a manifold located on an adjacent side of the stack. The fuel and oxidant are generally pumped through the manifolds. From the manifolds, the fuel and oxidant are separately introduced to fluid distribution surfaces on an appropriate structure such as an interconnect between cells or an end cap. The fluid distribution surfaces are positioned in fluid communication with the appropriate electrode, with the SOFC efficiency related, in part, to fluid distribution across the surface of the electrode.

Typically, fuel is introduced at the edge of the interconnect reacts with the electrode. The reaction (at an anode) generally creates electrons and water, wherein the water mixes with the fuel flowing across the electrode. Therefore, certain regions of the electrode are prone to diminished current density, since the fuel used at certain regions contains spent fluid, thus a decreased concentration in fuel.

What is needed in the art is an enhanced structure for distributing fluid to electrodes of SOFC's, particularly for distributing fresh fuel to anodes of SOFC's.

SUMMARY

The drawbacks and disadvantages of the prior art are overcome by an electrode fluid distributor includes a fluid passageway having a plurality of adjacent pairs of segments each including an inlet segment in fluid communication with an inlet and an outlet segment in fluid communication with an outlet. A baffle is disposed between adjacent inlet and outlet segments. Each inlet segment is in fluid communication with adjacent inlet segments and adjacent outlet segments, and each outlet segment is in fluid communication with adjacent outlet segments.

BRIEF DESCRIPTION OF THE DRAWINGS

Referring now to the figures, which are meant to be exemplary not limiting, and wherein like elements are numbered alike in the several figures.

DETAILED DESCRIPTION

Different types of SOFC systems exist, including tubular or planar systems. These various systems, while operating with different cell configurations, have similar functionality. Therefore, reference to a particular cell configuration and components for use within a particular cell configuration are intended to also represent similar components in other cell configurations, where applicable.

Generally, the system may comprise at least one SOFC, an engine, one or more heat exchangers, and optionally, one or more compressors, an exhaust turbine, a catalytic converter, preheating device, plasmatron, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components.

Figure 1:
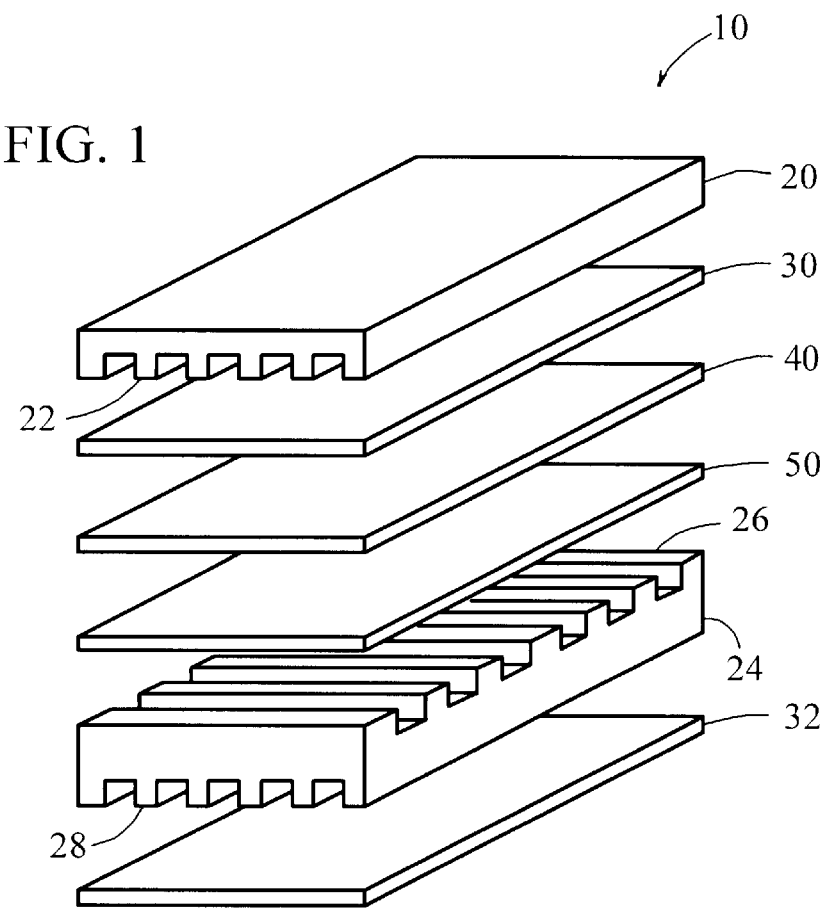
FIG. 1 is an expanded isometric view of a SOFC.

One configuration of a SOFC includes a stack of planar SOFC's. An electrochemical cell stack 10 is illustrated in FIG. 1. A fuel electrode or anode 30 and an oxygen electrode or cathode 50 are disposed on opposite sides of a solid electrolyte 40. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to an anode 32 of another SOFC. Anode 32 is disposed adjacent to interconnect 24 to illustrate the placement of and ability to stack several electrochemical cells connected to electrochemical cell 10.

The solid electrolyte 40 of the electrochemical cell 10 can be an ion conductor capable of transporting oxygen ions from the cathode 50 to the anode 30, that is compatible with the environment in which the SOFC will be utilized (e.g., temperatures of about −40° C. up to about 1,000° C.). Generally, solid electrolyte materials include conventional materials, such as ceramics and/or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+2}$ valence metal oxides).

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40% porous, typically preferred.

The composition of the anode 30 and cathode 50 can comprise elements such as zirconium, yttrium, nickel, manganese, strontium, lanthanum, iron, and cobalt, samarium, calcium, proseodynium, and, oxides, alloys, and combinations comprising at least one of the foregoing elements. Preferably, the anode material is formed upon a ceramic skeleton, such as nickel oxide-yttria-stabilized zirconia, and the like, for thermal compatibility.

Either or both the anode 30 and the cathode 50 can be formed on the electrolyte 40 by a variety of techniques including sputtering, chemical vapor deposition, screen printing, spraying, dipping, painting, and stenciling, among others. The electrodes are disposed typically about 10 to about 1,000 microns or so in thickness. In the anode supported case, the anode is preferably about 1,000 microns, the electrolyte about 10 microns, and the cathode about 40 microns.

The electrochemical cell 10 can be electrically connected with other electrochemical cells by using for example, interconnect 24. Depending upon the geometry of the SOFC, the fuel and the oxidant flow through the electrochemical cell 10 via the passageways of the end cap 20 and the interconnect 24. The end cap 20 and the interconnect 24 are generally formed of a material capable of withstanding the pressures and temperatures of the SOFC, and capable of conducting electricity. For example, suitable end caps and interconnects can be in the form of mats, fibers (chopped, woven, non-woven, long and the like) which are capable of withstanding automobile operating conditions (e.g., temperatures of about −40° C. to about 1,000° C.) and are electrically conductive material compatible with the oxidizing or reducing nature of the fuel cell environment. Some possible end caps and interconnects can comprise materials such as silver, copper, ferrous materials, strontium, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage, generally from about 0.5 to about 1.1 volts. Higher voltages are attained by electrically connecting a plurality of electrochemical cells in series to form a stack. The total number of cells forming a stack can range from 2 to several hundred, depending on power requirements, space and weight restrictions, economics, and the like.

The dimensions of each cell may vary generally depending on the spacial requirements and the desired output. Generally, SOFC's may be employed in areas ranging from a microscopic scale, wherein each cell has an area of several microns squared, to an industrial power generation scale, such as in a power plant wherein each cell has an area of several meters squared. Particularly useful dimensions for SOFC's employed in automotive applications are between 50 and 200 squared centimeters per cell ($cm^2$/cell), but it will be understood that these dimensions may vary depending on various design considerations.

Figure 2:
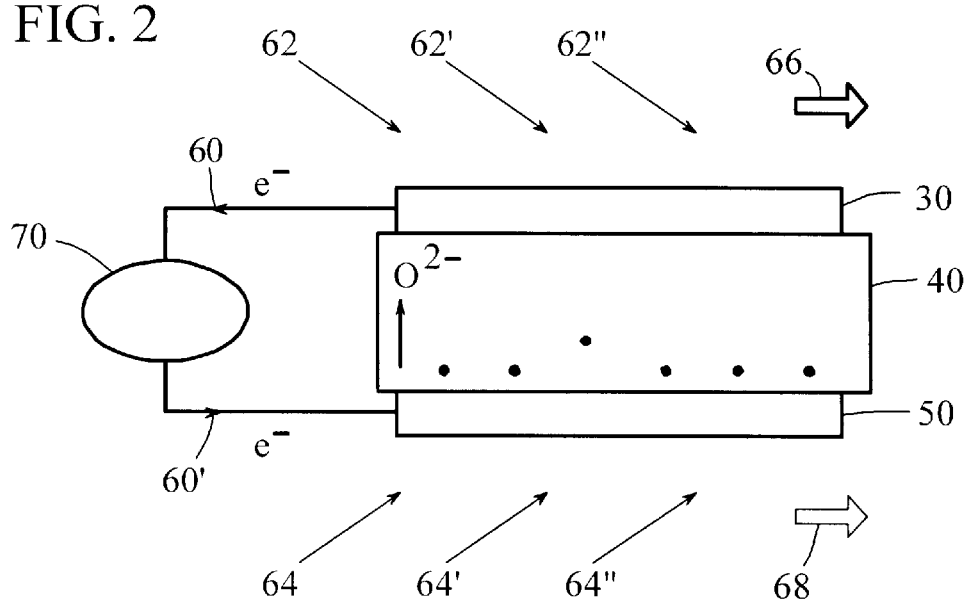
FIG. 2 is a schematic of the operation of a SOFC.

In operation, the electrochemical cell 10 produces a current flow as illustrated by current flow arrows 60, 60' in FIG. 2. Oxidant gases, such as oxygen or air, can be introduced to the cathode side of the cell, flowing as illustrated by the oxidant flow arrows 64, 64', 64". The oxidant receives the flowing electrons (e⁻) and converts them into oxide ions (O²⁻), which diffuse through the electrolyte 40 to the anode 30, as depicted in the following reaction:

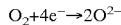

At the anode, the oxide ions react with a fuel, such as hydrogen, carbon monoxide, methane, other hydrocarbons, or a combination comprising at least one of the foregoing fuels, which is introduced to the electrochemical cell 10 as illustrated by the fuel flow arrows 62, 62', 62". The reaction of the fuel and oxide ions produces electrons (e⁻), which flow outside of the electrochemical cell 10 to the external circuit 70 and back to the cathode 50. The fuel/oxide ion reaction is depicted in the following reactions:

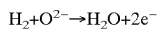 (when fuel is hydrogen)

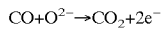 (when fuel is carbon monoxide)

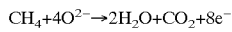 (when fuel is methane)

Unreacted fuel and byproducts, such as water or carbon monoxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts these oxide ions (O⁻²) between the anode 30 and the cathode 50, maintaining an overall electrical charge balance. The cycle of flowing electrons (e⁻) from the anode 30 through the external circuit 70 to the cathode 50 creates electrical energy for harnessing. This electrical energy can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike electricity generated in conventional motor vehicles, the electricity produced by the SOFC is direct current which can be matched to the normal system voltage of the vehicle. This minimizes or avoids the need for devices such as diodes, voltage conversion and other losses, such as resistive losses in the wiring and in/out of the battery, associated with conventional vehicle systems and traditional hybrid electrical systems. This high efficiency electricity allows electrification of the vehicle, including functions such as air conditioning and others, while allowing weight, fuel economy and performance advantages compared to conventional hybrid electric mechanization and conventional internal combustion engine systems.

During start-up and for cabin heating the SOFC can be operated at high adiabatic temperatures, e.g. up to about 1,000° C., subject to catalyst limitations, with typical operating temperatures ranging from about 600° C. to about 900° C., and preferably about 650° C. to about 800° C. Consequently, at least one heat exchanger is preferably employed to cool the SOFC effluent and conversely heat the air prior to entering the SOFC, with conventional heat exchangers generally employed.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropch, dimethyl ether, and others; and any combinations comprising at least one of the foregoing fuels. The preferred fuel is typically based upon the type of engine employed, with lighter fuels, i.e. those which can be more readily vaporized and/or conventional fuels which are readily available to consumers, generally preferred.

Furthermore, the fuel for the SOFC can be processed in a reformer. A reformer generally converts one type of fuel to a fuel usable by the SOFC (e.g., hydrogen). Mainly two types of reformer technologies are employed, steam reformers which employ an exothermic reaction and partial oxidation reformers which employ an endothermic reaction. Steam reformer technology is generally employed for converting methanol to hydrogen. Partial oxidation reformers are generally employed for converting gasoline to hydrogen. Typical considerations for the reformers include rapid start, dynamic response time, fuel conversion efficiency, size, and weight.

The SOFC may be used in conjunction with an engine, for example, to produce tractive power for a vehicle. Within the engine, SOFC effluent, air, and/or fuel are burned to produce energy, while the remainder of unburned fuel and reformed fuel is used as fuel in the SOFC. The engine can be any conventional combustion engine including, but not limited to, internal combustion engines such as spark ignited and compression ignited engines, including, but not limited to, variable compression engines.

Similar to the engine, the turbine can be employed to recover energy from the engine effluent to produce tractive power and further to recover energy to operate the compressor(s) and preferably to generate electricity for various uses throughout the system and/or vehicle. The turbine employed can be any conventional turbine useful in automotive or power generation applications. In a preferred embodiment, the turbine and/or compressor may be accelerated or decelerated by a motor/generator to increase the compression (when required to increase the compression for optimal system performance) or to decrease compression (when excessive energy is available in the exhaust gases). For example, a high-speed electrical machine can be linked to the turbine and compressor.

After passing through the turbine, the SOFC effluent preferably enters a catalytic converter in order to attain extremely low, nearly zero emissions of hydrocarbons and nitric oxide. The catalytic converter is typical of those used in automotive applications, including those employing (1) noble metals and alloys thereof, such as platinum, rhodium and palladium catalysts and alloys thereof, among others and/or (2) particulate filtering and destruction.

Optional equipment which additionally may be employed with the present system includes, but is not limited to, sensors and actuators, heat exchangers, a battery, a fuel reformer, a burner, phase change material, a thermal storage system, a plasmatron, a desulfurizer, or any combination comprising at least one of the foregoing equipment. Desulfurizer equipment may also be employed, for example, if the fuel is rich in sulfur, or if the catalyst employed in the SOFC is particularly intolerant to sulfur, such as nickel-based catalysts.

Figure 3:
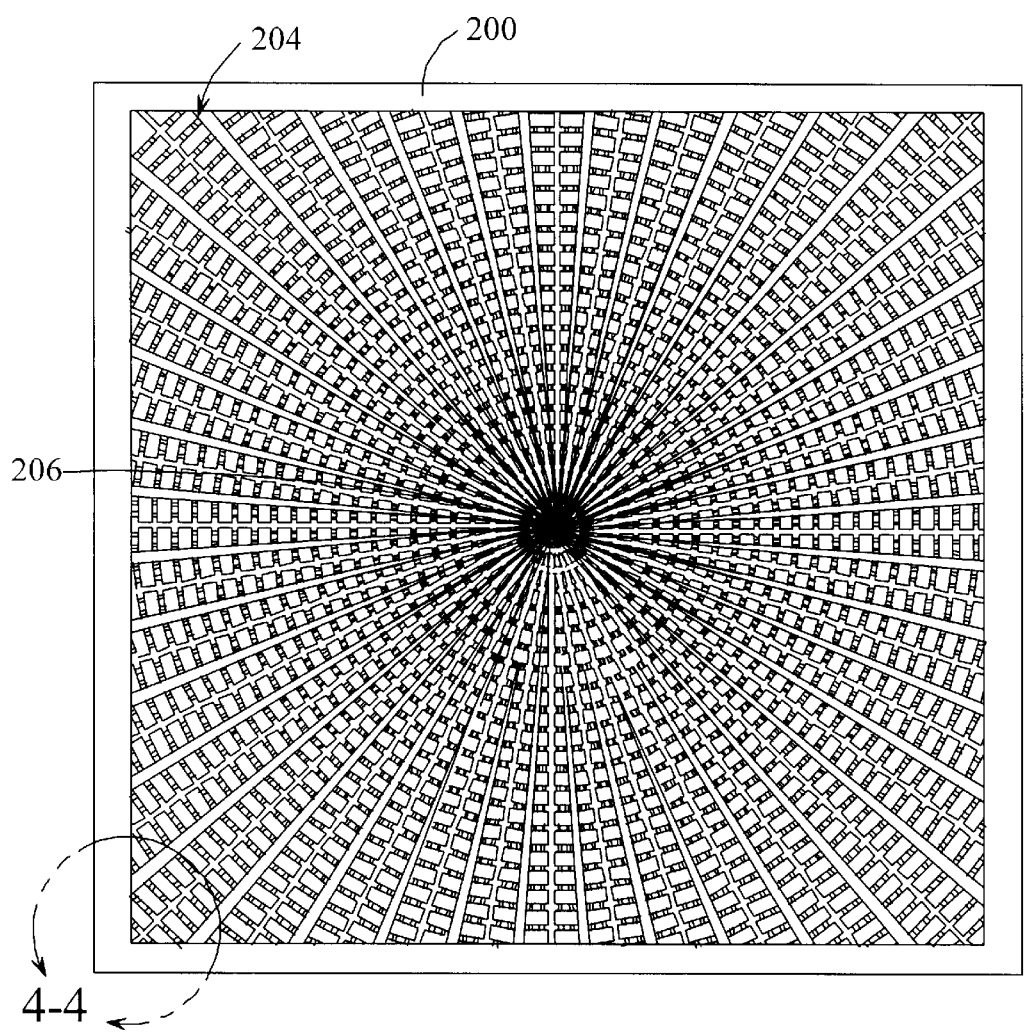
FIG. 3 is a partial plan view of a fluid distribution system according to one embodiment.

FIG. 3 is a top plan view of a fluid distribution surface 200, for example, suitable for use as a portion of the end cap 20 or interconnect 24 described above. Surface 200 comprises a plurality of fluid passageways 204 that radiate around a point 206, wherein each fluid passageway 204 is generally wedge shaped. Alternatively, the point 206 may be a region of various shapes, such as circular, oval, square, rectangular, triangular, polygonal, or other shape.

Although reference is made herein to a plurality of fluid passageways 204, it is contemplated that a single fluid passageway 204 can be employed as a portion of a fluid distribution system comprising fluid distribution systems other than the fluid passageway 204. Alternatively, a single fluid passageway 204 may be employed with a cell having suitable dimensions. Furthermore, a plurality of fluid passageways 204 may comprise a portion of a fluid distribution system.

Figure 4:
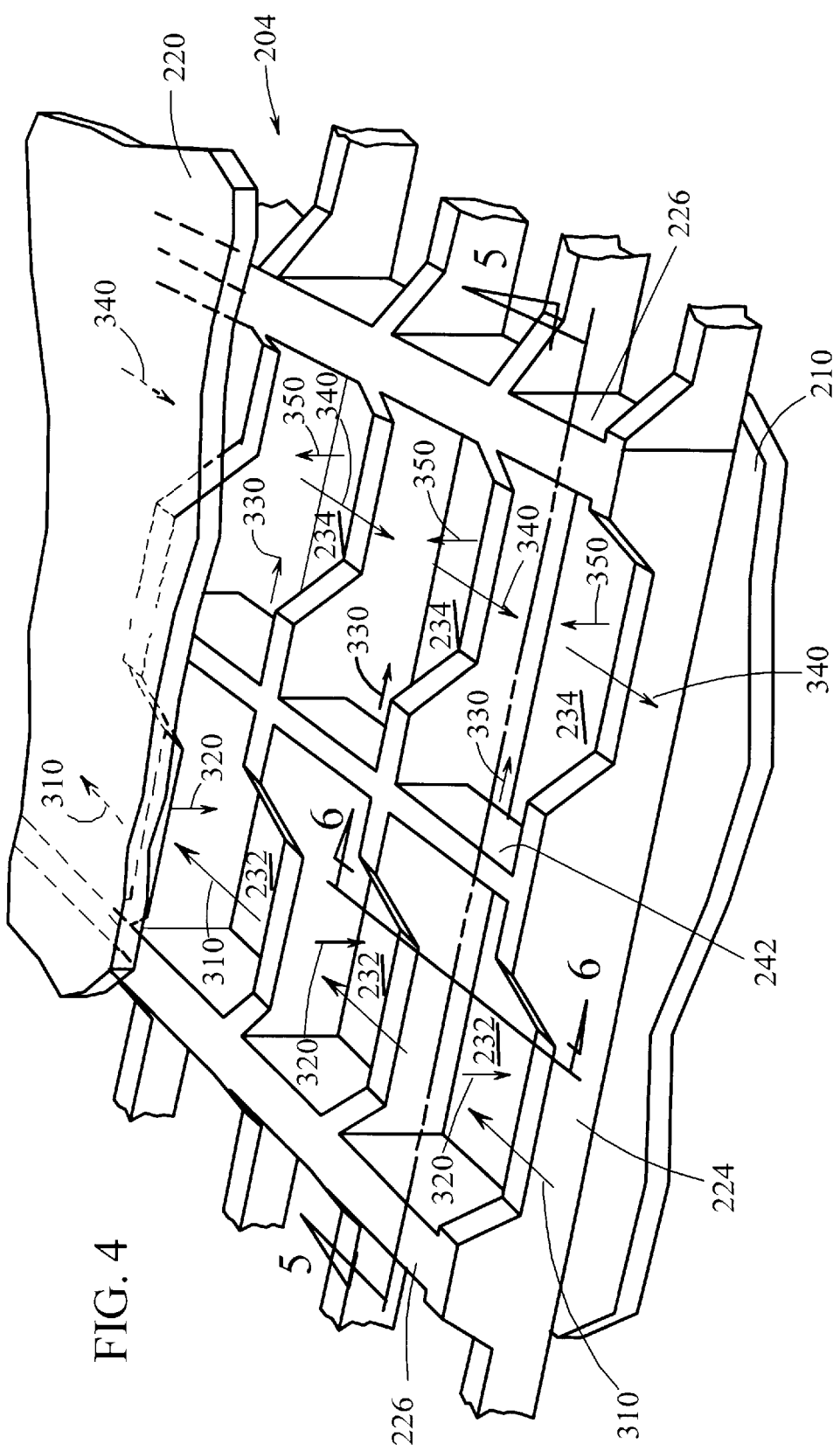
FIG. 4 is a partial isometric view of a fluid passageway employed within the fluid distribution system of FIG. 3.
Figure 5:
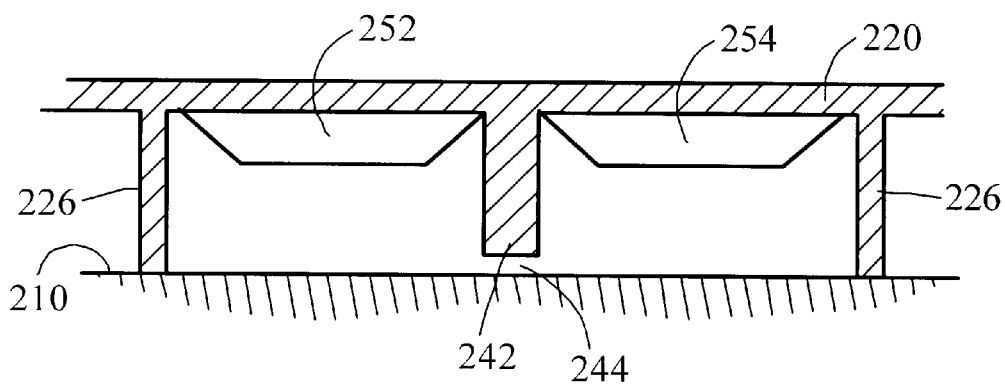
FIG. 5 is a sectional view along lines 5—5 of FIG. 4.
Figure 6:
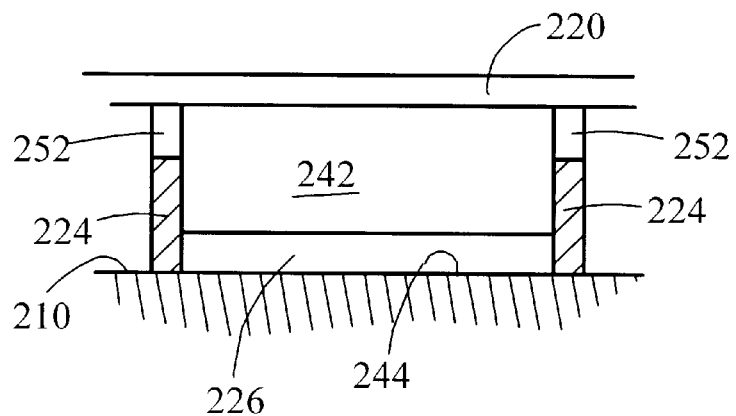
FIG. 6 is a sectional view along lines 6—6 of FIG. 4.

Referring also now to FIGS. 4–6, a portion of the fluid passageway 204 in fluid communication with an electrode 210 is detailed. The fluid passageway 204 generally comprises an inlet channel and an outlet channel. The inlet channel comprises a plurality of inlet segments 232, and the outlet channel comprises a plurality of outlet segments 234. A plurality of the segments pairs (each segment pair comprising an inlet segment 232 and an adjacent outlet segment 234) are optionally provided substantially in the direction along the length of the fluid passageway 204 from a conduit system generally at the outer edge of the surface 200 to the point 206 (FIG. 3), hereinafter referred to as the radial direction. Thus, in this embodiment, since the width of fluid passageway 204 decreases from the outer edge to the point 206, the width of segments 232, 234 correspondingly decrease.

The segments 232, 234 are bound in the radial direction by a pair of walls 224, and are separated from adjacent fluid passageways by a pair of sidewalls 226. Each of the segments 232, 234 is in fluid communication with a portion of the electrode 210 (wherein each portion is hereinafter referred to as the "segmental electrode portion"). Therefore, since the width of segments 232, 234 decrease in the radial direction, the area of each of the segmental electrode portions decreases from a larger area to a smaller area in the radial direction.

To segregate the surface 200 (FIG. 3) comprising fluid passageways 204 from the opposite surface, a separator 220 is formed. Separator 220 can be an end portion of an end cap or a dividing portion between two sides of an interconnect. The walls 224 and the sidewalls 226 generally extend from the separator 220 such that at least a portion of each wall 224 and at least a portion of each sidewall 226 abut the electrode 210. Those portions that abut the electrode 210 provide both electrical contact and fluid segregation between segments and between adjacent fluid passageways. Generally, sufficient electrical contact is provided for the respective size, load demands, operating conditions, and the like. Typically an electrical contact area of at least about 5%, with at least about 10% preferred, and about 10% to about 25% especially preferred, based upon the area of anode 201. The electrical contact is generally via the edges of walls 224, 226.

Each pair of segments comprising an inlet segment 232 and an outlet segment 234 are separated by a baffle 242. Fluid communication between the inlet segment 232 and the outlet segment 234 is at least partially hindered by the baffle 242. In one embodiment, the baffle 242 is positioned between a pair of walls 224 such that an opening 244 is created between the baffle 242 and the electrode 210. Alternatively, openings may be provided within the baffle 242. Further, one or more alternative openings may be combined with the opening 244. Such alternative openings may comprise holes, slots, apertures, pores, or other discreet openings which enable sufficient fluid communication between the segments 232 and 234. Any of these alternatives may provide certain turbulence between segments 232 and 234 (cross turbulence) during operation, resulting in vortices. These may be desirable for improved mixing of the fuel and exhaust products.

For fluid communication in the radial direction, each wall 224 comprises a first opening 252 and a second opening 254. A plurality of first openings 252 form an inlet channel through a plurality of corresponding inlet segments 232, and a plurality of second openings 254 form an outlet channel through a plurality of corresponding outlet segments 234. The inlet channel is in fluid communication with a feed fuel manifold, and the outlet channel is in fluid communication with a spent fuel manifold. To generate the driving force, the pressure in the feed fuel manifold is maintained at a higher level than the pressure in the spent fuel manifold. The pressure differential may be based on the inherent pressure drop through the passage, or it optionally may be adjusted based on target flow, varying cross-section of the opening, or the like.

Openings 252, 254 may be formed as cut away portions having a top generally bound by separator 220, as shown. Alternatively, openings may be provided elsewhere on the wall 224. Further, one or more alternative openings comprising holes, slots, or other openings, may be combined with the openings 252, 254. Still further, openings 254 and openings 252 may be configured and dimensioned differently or identical to one another, as well as the same as or different from each other opening 254, 252, respectively. Possible opening geometries range from multi-sided, e.g., semi-rectangular, semi-hexagonal, or other semi-polygonal shape, to smooth, e.g., semi-circle, semi-elliptical, and the like.

Further alternative configurations may also provide for some fluid communication between adjacent fluid passageways 204. This may be provided for by forming all or part of the walls 226 with a porous material, or by forming openings on the walls 226. Any of these alternatives may provide certain turbulence between proximate fluid passageways during operation, resulting in vortices. However, in order to attain the desired fluid distribution across the electrode, the amount of fluid communication allowable between fluid passageways 204 is preferably minimal as compared to the fluid flow in the radial direction.

The surface 200 including the fluid passageways 204 may be formed by various techniques, including but not limited to, machining, casting, molding, milling, chemical etching, and the like, as well as any combination comprising at least one of the foregoing techniques.

Due to the fluid passageway 204 configuration, each segment 232 and 234 are contacted with substantially fresh fuel. Essentially, the surface 200 is positioned adjacent to a fuel electrode, and a feed fuel is introduced into the inlet channel generally via the feed fuel manifold. The feed fuel passes through the plurality of the first openings 252 in the radial direction, generally indicated by arrows 310. As the feed fuel flows through each of the inlet segments 232, fresh fuel flows toward the segmental electrode portion proximate to the associated inlet segment 232 in a direction generally indicated by the arrows 320. Additionally, fresh fuel along with spent fuel from the electrode portion proximate to segment 232 flows through the opening 244 to the outlet segment 234 in a direction generally indicated by the arrows 330. Therefore, fluid is substantially overtly directed to electrode portions defined by the pairs of segments 232, 234 (as opposed to the fluid bleeding or flowing across an electrode wherein spent fuel and fresh fuel combined are directed into the individual segments).

At each inlet segment electrode portion, the fuel generally reacts to form water electrons that energize the external circuit as described generally above with respect to FIG. 2. The resultant water and any unreacted fuel (hereinafter the spent fluid) flow from the inlet segment 232 through the opening 244 to the outlet segment 234 in a direction generally indicated by the arrows 330. The spent fluid from the outlet segments 234 exit via the second openings 254 in a direction generally indicated by arrows 340, and exit the fluid passageway 204 in a direction generally indicated by arrows 350.

When the openings are suitably configured and dimensioned, substantially fresh fuel distributed to each pair of inlet segment 232 and outlet segment 234 as described above. More particularly, openings should be configured and dimensioned such that the same flow rate of the same concentration fuel is achieved per area unit of the cell. In fluid passageway 204, this is accomplished generally by varying the area dimension of the opening from large to small in the radial direction. Although the segmental electrode areas and the widths of the segments 232, 234 decrease in the radial direction, the height of the openings 252, 254 may vary or preferably remain substantially uniform.

Figure 7:
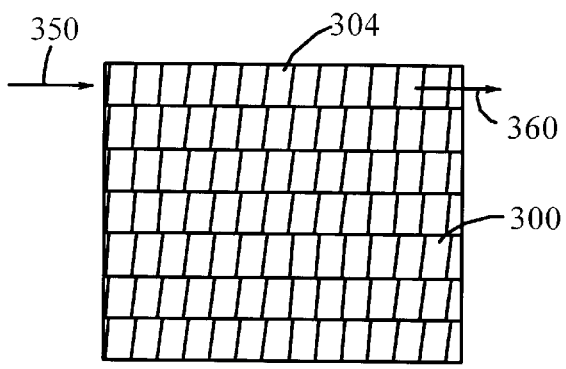
FIG. 7 is a partial plan view of a fluid distribution system according to another embodiment.

For example, a suitable fluid passageway 204 may have the following dimensions: a width between walls 226 of about 0.1 millimeters ("mm") to about 50 mm, preferably about 1 mm to about 20 mm, and more preferably about 8 mm to about 12 mm; a height of wall 226 of about 0.1 mm to about 5 mm, preferably about 0.1 mm to about 1 mm, and more preferably about 0.3 mm to about 0.7 mm; and openings 244 of about 0.05 mm to about 0.5 mm, preferably about 0.05 mm to about 0.2 mm, and more preferably about 0.08 mm to about 0.12 mm. Possible alternative configurations for the fluid passageway are provided in FIGS. 7 and 8. FIG. 7 shows a partial top view of a surface 300 comprising a plurality of fluid passageways 304, which are similar in detail to fluid passageways 204. Generally, fluid flows into an inlet in the direction indicated by arrow 350, and passes across an electrode via the plurality of fluid passageways 304, which are substantially parallel to one another and each have substantially the same width across the length of the electrode. In this embodiment, the outlet fluid may exit on the opposite side of the inlet fluid in a direction indicated by arrow 360, typically with suitable manifolds and a suitable pressure difference between the inlet conduit and the outlet conduit. Alternatively, the spent fluid may exit at the same side as the inlet fluid using openings similar to 252, 254, and 244.

In the fluid passageway 304, the width remains substantially the same. Therefore, to achieve approximately the same flow rate of the same concentration fuel is achieved per area unit of the cell, the area dimension of the opening may be varied from large to small generally in the direction of inlet flow or the width of the segments can be varied, e.g., with segments 232 having a greater width than segments 234. Since the segmental electrode area and the width of the fluid passageway 304 remain substantially the same, the height of openings similar to the openings 252 and/or 254 may be varied from large to small generally in the direction of inlet flow.

Figure 8:
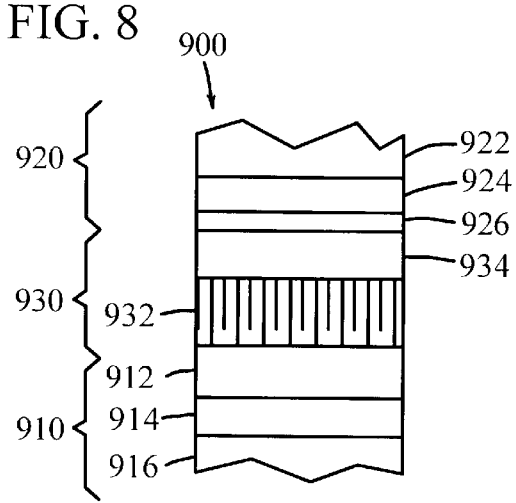
FIG. 8 is a schematic of a SOFC system incorporating the fluid distribution system.

Referring now to FIG. 8, an interconnect 930 is provided. A portion 932 comprises a surface similar to surface 200 described above. Portion 932 is at least partially in fluid communication with an anode 912 of a first cell 910. The first cell 910 comprises the anode 912, an electrolyte 914, and a cathode 916. The interconnect 930 comprises portion 932 on one side thereof, and another portion 934 on the opposite side of interconnect 930, where portion 934 is designed similar to or different from portion 932. At least a portion of portion 934 is at least partially in fluid communication with a cathode 926 of a second cell 920. Second cell 920 comprises cathode 926, anode 922, and an electrolyte 924.

Figure 9:
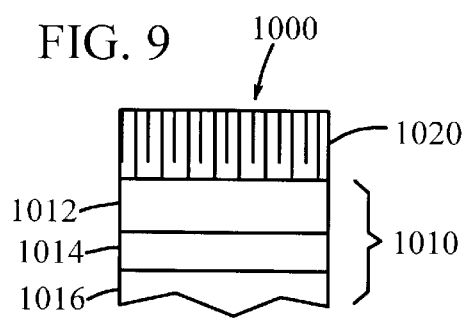
FIG. 9 is a schematic of another SOFC system incorporating the fluid distribution system.

In another embodiment, and referring now to FIG. 9, a cell system 1000 comprises an end cap 1020. End cap 1020 may be used adjacent to a first cell in a stack. At least a portion of end cap 1020 is at least in partially fluid communication with a cathode 1012 of a cell 1010. Cell 1010 comprises the cathode 1012, an electrolyte 1014, and an anode 1016.

The benefits of the fluid distribution surface design include providing a substantially uniform fluid distribution across the surface of the electrode. The uniform fluid distribution, which is preferably uniform in both flow rate and concentration, allows for increased current density, an overall increase in cell output, decreased fuel waste, capability to produce smaller cells, optimal usage of available cell area, elimination of macro scale temperature gradients which adversely affect durability, among other benefits.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. An electrode fluid distributor comprising:
   a fluid passageway having a plurality of adjacent segment pairs each comprising an inlet segment and an adjacent outlet segment, said inlet segments in fluid communication with an inlet, said outlet segments in fluid communication with an outlet, and a baffle disposed between adjacent inlet and outlet segments,
   wherein each inlet segment is in fluid communication with adjacent inlet segments and adjacent outlet segments, and further wherein each outlet segment is in fluid communication with adjacent outlet segments, the baffle having a baffle first side and a baffle second side opposite the baffle first side, wherein at least one inlet segment is in fluid communication with an adjacent outlet segment via a passage at the baffle first side.

2. The electrode fluid distributor as in claim 1, the adjacent segment pairs separated by a wall having a first wall side corresponding with the first baffle side and a second wall side corresponding with the second baffle side, wherein at least one inlet segment is in fluid communication with an adjacent inlet segment pair via a passage at the wall second side.

3. The electrode fluid distributor as in claim 1, the adjacent segment pairs separated by a wall having a first wall side corresponding with the first baffle side and a second wall side corresponding with the second baffle side, wherein at least one outlet segment is in fluid communication with an adjacent outlet segment pair via a passage at the wall second side.

4. The electrode fluid distributor as in claim 1, further comprising a plurality of fluid passageways each extending in substantially the same direction.

5. An electrode fluid distributor comprising:
   a fluid passageway having a plurality of adjacent segment pairs each comprising a inlet segment and an adjacent outlet segment, said inlet segments in fluid communication with an inlet, said outlet segments in fluid communication with an outlet, and a baffle disposed between adjacent inlet and outlet segments,
   wherein each inlet segment is in fluid communication with adjacent inlet segments and adjacent outlet segments, and further wherein each outlet segment is in fluid communication with adjacent outlet segments, the adjacent segment airs separated by a wall, wherein fluid communication between the adjacent inlet segments is with a plurality of first openings on the respective walls each having a first opening area, and wherein fluid communication between the adjacent outlet segments is with a plurality of second openings on the respective walls each having a second opening area.

6. The electrode fluid distributor as in claim 5, further comprising a plurality of fluid passageways each having a length extending radially from an edge of the distributor to a point on the distributor, each segment pair characterized by an axial width and a radial length, wherein the segment pair axial width of adjacent segment pairs decreases and the radial length of adjacent segment pairs remains substantially the same in the direction of the length of the fluid passageway extending radially from the edge of the distributor to the point on the distributor.

7. The electrode fluid distributor as in claim 6, wherein adjacent segment pairs have first opening areas and second opening areas that vary proportionally with the variation in axial width.

8. The electrode fluid distributor as in claim 5, the fluid passageway having a dimension, the adjacent segment pairs characterized by a width and a length, wherein the width remains substantially the same and the length remains the same along the dimension of the fluid passageway.

9. The electrode fluid distributor as in claim 8, wherein adjacent segment pairs have first opening areas and second opening areas that vary along the dimension of the fluid passageway.

10. The electrode fluid distributor as in claim 5, the fluid passageway having a dimension, the adjacent segment pairs characterized by a width and a length, wherein the width remains substantially the same and the length varies along the dimension of the fluid passageway.

11. The electrode fluid distributor as in claim 10, wherein adjacent segment pairs have first opening areas and second opening areas that vary proportionally with the variation in segment pair length along the dimension of the fluid passageway.

12. The electrode fluid distributor as in claim 5, further comprising a plurality of fluid passageways each extending in substantially the same direction.

13. An electrode fluid distributor comprising:
a fluid passageway having a plurality of adjacent segment pairs each comprising an inlet segment and an adjacent outlet segment, said inlet segments in fluid communication with an inlet, said outlet segments in fluid communication with an outlet, and a baffle disposed between adjacent inlet and outlet segments,
wherein each inlet segment is in fluid communication with adjacent inlet segments and adjacent outlet segments, and further wherein each outlet segment is in fluid communication with adjacent outlet segments, the inlet and the outlet are at the edge of the distributor.

14. The electrode fluid distributor as in claim 13, further comprising plurality of fluid passageways each extending radially from an edge of the distributor to a point on the distributor.

15. The electrode fluid distributor as in claim 13, further comprising a plurality of fluid passageways each extending in substantially the same direction.

16. The electrode fluid distributor as in claim 15, wherein the inlet and the outlet are at a same side of the distributor.

17. The electrode fluid distributor as in claim 15, wherein the inlet and the outlet are at opposite sides of the distributor.

18. A solid oxide fuel cell comprising:
a first electrode;
a second electrode;
an electrolyte between said first electrode and said second electrode; and
an interconnect at least in partial fluid communication with said first electrode, said interconnect comprising a fluid passageway having adjacent segment pairs each comprising an inlet segment and an adjacent outlet segment, said inlet segment in fluid communication with an inlet said outlet segments in fluid communication n with an outlet, and a baffle disposed between adjacent inlet and outlet segments,
wherein each inlet segment is in fluid communication with adjacent inlet segments and adjacent outlet segments, and further wherein each outlet segment is in fluid communication with adjacent outlet segments, the baffle having a baffle first side and a baffle second side opposite the baffle first side, wherein at least one inlet segment is in fluid communication with an adjacent outlet segment via a passage at the baffle first side.

19. A solid oxide fuel cell comprising;
a first electrode;
a second electrode;
an electrolyte between said first electrode and said second electrode; and
an interconnect at least in partial fluid communication with said first electrode, said interconnect comprising a fluid passageway having adjacent segment pairs each comprising an inlet segment and an adjacent outlet segment, said inlet segments in fluid communication with an inlet, said outlet segments in fluid communication with an outlet, and a baffle disposed between adjacent inlet and outlet segments,
wherein each inlet segment is in fluid communication with adjacent inlet so emits and adjacent outlet segments, and further wherein each outlet segment is i fluid communication with adjacent outlet segments, the adjacent segment airs separated by a wall, fluid communication between the adjacent inlet so emits is with a plurality of first openings on the respective walls each having a first opening area and wherein fluid communication between the adjacent outlet se emits is with a plurality of second openings on the respective walls each having a second opening area.

20. A solid oxide fuel cell comprising:
a first electrode;
a second electrode;
an electrolyte between said first electrode and said second electrode; and
an interconnect at least in partial fluid communication with said first electrode, said interconnect comprising a fluid passageway having adjacent segment pairs each comprising an inlet segment and an adjacent outlet segment, said inlet segments in fluid communication with an inlet, said outlet segments in fluid communication with an outlet, and a baffle disposed between adjacent inlet and outlet segments,
wherein each inlet segment is in fluid communication with adjacent inlet segments and adjacent outlet segments, and further wherein each outlet segment is in fluid communication with adjacent outlet segments, the inlet and the outlet are at the edge of the distributor.

21. The solid oxide fuel cell as in claim 20, further comprising a plurality of fluid passageways each extending radially from an edge of the distributor to a point on the distributor.

* * * * *